Patented May 20, 1952

2,597,631

UNITED STATES PATENT OFFICE 2,597,631

METHOD OF PREPARING BARIUM SILICATE PHOSPHOR

Herman C. Froelich, Cleveland Heights, Ohio, assignor to General Electric Company, a corporation of New York No Drawing. Application March 22, 1950, Serial No. 151,320

7 Claims. (Cl. 252—301.4)

My invention relates generally to fluorescent materials or phosphors and more particularly to barium silicate phosphors. Still more particularly, my invention relates to a method of preparing phosphor of barium disilicate activated with lead ($BaSi_2O_5 \cdot Pb$).

This application is a continuation-in-part of my copending patent application Serial No. 110,477, filed August 15, 1949, now abandoned, and assigned to the assignee of the present application.

Such phosphor gives good results when employed in fluorescent lamps of the low pressure mercury vapor type, and emits ultraviolet radiations of longer wavelength when excited by short ultraviolet radiations of the mercury vapor discharge. However, it is difficult to produce, particularly on a large scale. The phosphor may be produced by preparing a mixture of suitable proportions of barium carbonate, silica and lead fluoride, ball-milling the mixture with water, drying, and firing at a temperature of about 1100° C. This process produces a fairly satisfactory material but requires a firing period as long as 24 hours and also requires wet mixing of the raw materials.

An object of my invention is to provide a method which permits shorter firing time, as well as complete dry handling of the ingredients, and which produces phosphors of high efficiency, even higher than obtained heretofore.

According to the present invention, I have discovered that when the phosphor ingredients are fired with a catalyst consisting of a combination of fluoride and chloride the combination is much more potent and behaves differently than either one of these halides alone. Phosphors have been thus prepared in about 3 hours total firing time and with complete dry handling of the materials.

In preparing a phosphor, a base mixture may be prepared containing compounds of barium and silicon which when heated will react to form barium disilicate together with an activating proportion of a lead compound. As sources of barium and silicon I may employ the oxides or materials which, upon heating, break down to yield the oxides. Similarly, various compounds may be employed as the source of the lead activator. As sources of fluorine and chlorine I prefer to employ barium fluoride and barium chloride, preferably in a total amount of 2-12 mol per cent of the barium silicate, and preferably in about equal proportions although a mol ratio of Cl:F within the range of about 0.2:2 to 2:0.2 may be used. However, good results have also been obtained with ammonium fluoride and chloride in equivalent amounts. Also useful are the fluoride and chloride of calcium in equivalent amounts. Other fluorides which may be used are: $PbF_2$, $NH_4F$ or $NH_4HF_2$. Other chlorides which also proved to be effective are $SrCl_2$, $MgCl_2$, $AlCl_3$ and $ZnCl_2$, likewise in equivalent amounts. This was surprising because phosphors in which 50 mol per cent of the barium were replaced with Ca, Sr, Mg, Bc or Li were of low brightness. Yet, when the chlorides of these elements were used for refiring the material, which had been previously fired with a fluoride catalyst, in amounts of about 5 mol per cent of the barium, phosphor brightness was either unchanged or only slightly reduced. Moreover, the result was unexpected because the same technique applied to phosphor of calcium silicate activated with lead and manganese gave poor results when using halides other than those of calcium and ammonium.

Substantially the same results were obtained when the amount of $BaF_2$ in the original mixture was either doubled or halved, and when the amount of barium chloride was lowered to 1 per cent or increased to 8 per cent, and when the firing temperature was raised to 1150° C. or lowered to 1050° C. for either the first or the second fire, or for both. The final choice of composition and firing temperature depends upon the size and dimensions of the powder charge and the furnace. Neither of them are very critical. They must be so adjusted by trial and error that the finest particle size powder of good working characteristics and lamp performance is obtained. In general, firing temperatures of about 1000–1200° C. may be employed.

When the material was used in a low pressure mercury vapor lamp, the initial output was about 131 relative units of energy compared with about 104 units for lamps containing phosphor prepared by the prior method referred to above. When about ½ to 5 per cent of $CaCl_2 \cdot 2H_2O$ was used in the refiring step in place of $BaCl_2$ the efficiency was only insignificantly lower, averaging 129 as against 131 units above. X-ray investigation has indicated that the material prepared with $CaCl_2$ is a new composition of matter, namely, a lead activated barium-calcium disilicate. Identity of X-ray patterns for $BaSi_2O_5$ and $(Ba, Ca)Si_2O_5$, respectively, has shown that Ca as $CaSi_2O_5$ seems to form a solid solution with $BaSi_2O_5$ in amounts not exceeding about 5–7 mol per cent, even though normally a compound of composition $CaSi_2O_5$ does not exist.

The material may also be prepared by a single firing method wherein both the fluorine and chlorine catalysts are present in the original mixture. However, the double firing method produces the brightest phosphors in the shortest firing time and has proved to be more reproducible and convenient for larger scale production than the single firing method.

Example I

By way of example, the phosphor may be prepared as follows: A mixture of 300 grams $BaCO_3$ 240 grams silicic acid (containing about 10 per cent water), 12 grams PbO and 13.5 grams $BaF_2$ is ball-milled dry for about 1½ hours, and then fired on open silica trays in a lead-conditioned furnace at 1100° C. for 2 hours. When cold, the mass is again ball-milled dry with about 4 to 5 per cent of the weight of $BaCl_2 \cdot 2H_2O$ for an hour, and refired at 1100° C. for 2 hours. When cold, the phosphor is screened and is then ready for use.

Example II

A mixture of 300 grams $BaCO_3$, 240 grams silicic acid (containing about 10 per cent $H_2O$) and 13.2 grams $PbF_2$ is ball-milled dry for about 1½ hours, and then fired on open silica trays in a lead-conditioned furnace at 1100° C. for 2 hours. When cold, the mass is again ball-milled dry with about 4 to 5 per cent of its weight of $BaCl_2 \cdot 2H_2O$ for an hour, and refired at 1100° C. for 2 hours. When cold the phosphor is screened and is then ready for use.

If lead fluoride is used in place of the combination $PbO-BaF_2$, this replacement may be made on the basis of either the Pb or the F content of the mixture, or by employing both Pb and F. With a mol for mol replacement $PbF_2$ for PbO, (omitting any $BaF_2$), the amount of fluorine in the mixture will be about 40 per cent lower than that stated in Example I. With a mol for mol replacement of $PbF_2$ for $BaF_2$, (omitting any PbO), the amount of Pb in the mixture will be about 40 per cent higher than in Example I. Example II represents the situation in which $PbF_2$ replaces all the PbO, omitting $BaF_2$.

The amounts of the fluoride and chloride catalysts are about 5 mol per cent each of the $BaSi_2O_5$ base.

What I claim as new and desire to secure by Letters Patent of the United States is:

1. The method of preparing a fluorescent composition of lead activated barium disilicate which comprises mixing compounds of barium and silicon which upon heating will react to form barium disilicate with an activating proportion of a lead compound, and firing the mixture at a temperature of approximately 1000–1200° C. with additions of catalyst consisting of both a fluoride and a chloride, the fluoride being of the group consisting of fluorides of barium, ammonium, lead and calcium, and the chloride being of the group consisting of chlorides of barium, ammonium, calcium, strontium, magnesium, aluminum and zinc, the said catalysts being in a total amount of about 2–12 mol per cent of the barium disilicate with a mol ratio of fluorine to chlorine between about 0.2:2 and 2:0.2.

2. The method of preparing a fluorescent composition of lead activated barium disilicate which comprises mixing compounds of barium and silicon which upon heating will react to form barium disilicate with an activating proportion of a lead compound, and firing the mixture at a temperature of approximately 1000–1200° C. with additions of catalyst consisting of both a fluoride and a chloride, the fluoride consisting of barium fluoride and the chloride being of the group consisting of chlorides of barium, ammonium, calcium, strontium, magnesium, aluminum and zinc, the said catalysts being in a total amount of about 2–12 mol per cent of the barium silicate with a mol ratio of fluorine to chlorine between about 0.2:2 and 2:0.2.

3. The method of preparing a fluorescent composition of lead activated barium disilicate which comprises mixing compounds of barium and silicon which upon heating will react to form barium disilicate with an activating proportion of a lead compound and with a fluoride catalyst of the group consisting of fluorides of barium, ammonium, lead and calcium, heating the mixture at a temperature of about 1000–1200° C. for about 2 hours, remixing the resultant product with a chloride catalyst of the group consisting of chlorides of barium, ammonium, calcium, strontium, magnesium, aluminum and zinc and refiring at a temperature of about 1000–1200° C. for about an hour, the said catalysts being in a total amount of about 2–12 mol per cent of the barium disilicate with a mol ratio of fluorine to chlorine between about 0.2:2 and 2:0.2.

4. The method of preparing a fluorescent composition of lead activated barium disilicate which comprises mixing carbonate and silicate in proportions to form barium disilicate with an activating proportion of lead oxide and with barium fluoride, heating the mixture at a temperature of about 1000–12000° C. for about 2 hours, remixing the resultant product with barium chloride and refiring at a temperature of about 1000–1200° C. for about an hour, the amounts of the barium fluoride and chloride each being about 5 mol per cent of the barium disilicate base.

5. The method of preparing a fluorescent composition of lead activated barium disilicate which comprises mixing barium carbonate and silica in proportions to form barium disilicate with an activating proportion of lead oxide and with barium fluoride, heating the mixture at a temperature of about 1000–1200° C. for about 2 hours, remixing the resultant product with ammonium chloride and refiring at a temperature of about 1000–1200° C. for about an hour, the amounts of the barium fluoride and ammonium chloride each being about 5 mol per cent of the barium disilicate base.

6. The method of preparing a fluorescent composition of lead activated barium disilicate which comprises mixing barium carbonate and silica in proportions to form barium disilicate with an activating proportion of lead oxide and with barium fluoride, heating the mixture at a temperature of about 1000–1200° C. for about 2 hours, remixing the resultant product with calcium chloride and refiring at a temperature of about 1000–1200° C. for about an hour, the amounts of the barium fluoride and calcium chloride each about 5 mol per cent of the barium disilicate base.

7. The method of preparing a fluorescent composition of lead-activated barium disilicate which comprises mixing barium carbonate and silica in proportions to form barium disilicate with an activating proportion of lead oxide and with barium fluoride, heating the mixture at a temperature of about 1000–1200° C. for about 2 hours, remixing the resultant product with a chloride catalyst of the group consisting of chlorides of barium, ammonium, calcium, strontium, magnesium, aluminum and zinc and refiring at a temperature of about 1000–1200° C. for about an hour, the amounts of the barium fluoride and the chloride catalyst each being about 5 mol per cent of the barium disilicate base.

HERMAN C. FROELICH.

REFERENCES CITED

The following references are of record in the file of this patent:

UNITED STATES PATENTS

| Number | Name | Date |
|---|---|---|
| 2,486,112 | Butler | Oct. 25, 1949 |
| 2,497,140 | Schulman | Feb. 14, 1950 |
| 2,499,307 | Ginther | Feb. 28, 1950 |

FOREIGN PATENTS

| Number | Country | Date |
|---|---|---|
| 544,444 | Great Britain | Apr. 14, 1942 |